(12) United States Patent
Hajduczenia et al.

(10) Patent No.: US 9,674,035 B2
(45) Date of Patent: Jun. 6, 2017

(54) SEAMLESS CONFIGURATION UPDATE FOR OPTICAL NETWORK UNIT IN ETHERNET PASSIVE OPTICAL NETWORK

(75) Inventors: Marek Hajduczenia, Fiaes (PT); Meiyan Zang, Shanghai (CN); Peng Zhang, Shanghai (CN)

(73) Assignees: ZTE Corporation, Shenzhen (CN); ZTE Portugal-Projectos de Telecommunicações Unipessoal Lda, Lisbon (PT)

( * ) Notice: Subject to any disclaimer, the term of this patent is extended or adjusted under 35 U.S.C. 154(b) by 843 days.

(21) Appl. No.: 13/433,235

(22) Filed: Mar. 28, 2012

(65) Prior Publication Data
US 2012/0251113 A1    Oct. 4, 2012

Related U.S. Application Data

(60) Provisional application No. 61/468,504, filed on Mar. 28, 2011.

(51) Int. Cl.
*H04B 10/00* (2013.01)
*H04L 12/24* (2006.01)
*H04Q 11/00* (2006.01)

(52) U.S. Cl.
CPC ........ *H04L 41/082* (2013.01); *H04L 41/0869* (2013.01); *H04Q 11/0067* (2013.01); *H04Q 2011/0079* (2013.01)

(58) Field of Classification Search
CPC .............. H04L 41/082; H04L 41/0869; H04Q 11/0067; H04Q 11/067; H04Q 2011/0079

USPC ................................ 709/207, 222; 725/111
See application file for complete search history.

(56) References Cited

U.S. PATENT DOCUMENTS

| 2008/0010358 | A1* | 1/2008 | Jin ................................. 709/207 |
| 2008/0232801 | A1  | 9/2008 | Arnold et al. |
| 2011/0069953 | A1* | 3/2011 | Bronstein ........... H04L 12/2801 398/45 |
| 2011/0072119 | A1* | 3/2011 | Bronstein et al. ............ 709/222 |
| 2011/0131624 | A1* | 6/2011 | Wu ............................... 725/111 |

OTHER PUBLICATIONS

Cable Data Services, "DPoE™ Architecture Specification," DPoE-SP-ARCHv1.0-I01-110225, 65 pages, Feb. 2011.
Cable Data Services, "DPoE™ MAC and Upper Layer Protocols Requirements," DPoE-SP-MULPIv1.0-I01-110225, 65 pages, Feb. 2011.

* cited by examiner

*Primary Examiner* — Gbemileke J Onamuti
(74) *Attorney, Agent, or Firm* — Perkins Coie LLP

(57) ABSTRACT

Techniques for updating configuration of an Optical Network Unit (ONU) in an Ethernet Passive Optical Network (EPON) include receiving a notification that an updated configuration file is available for the ONU, obtaining the updated configuration file, performing a first validation of the updated configuration file for structural errors, determining changes between a current configuration of the ONU and the updated configuration file to identify ONU resources to implement to the changes, performing a second validation about whether the ONU resources to implement the changes are available or not at the ONU and applying the changes to the ONU when it is determined that the ONU resources to implement the changes are available at the ONU.

32 Claims, 6 Drawing Sheets

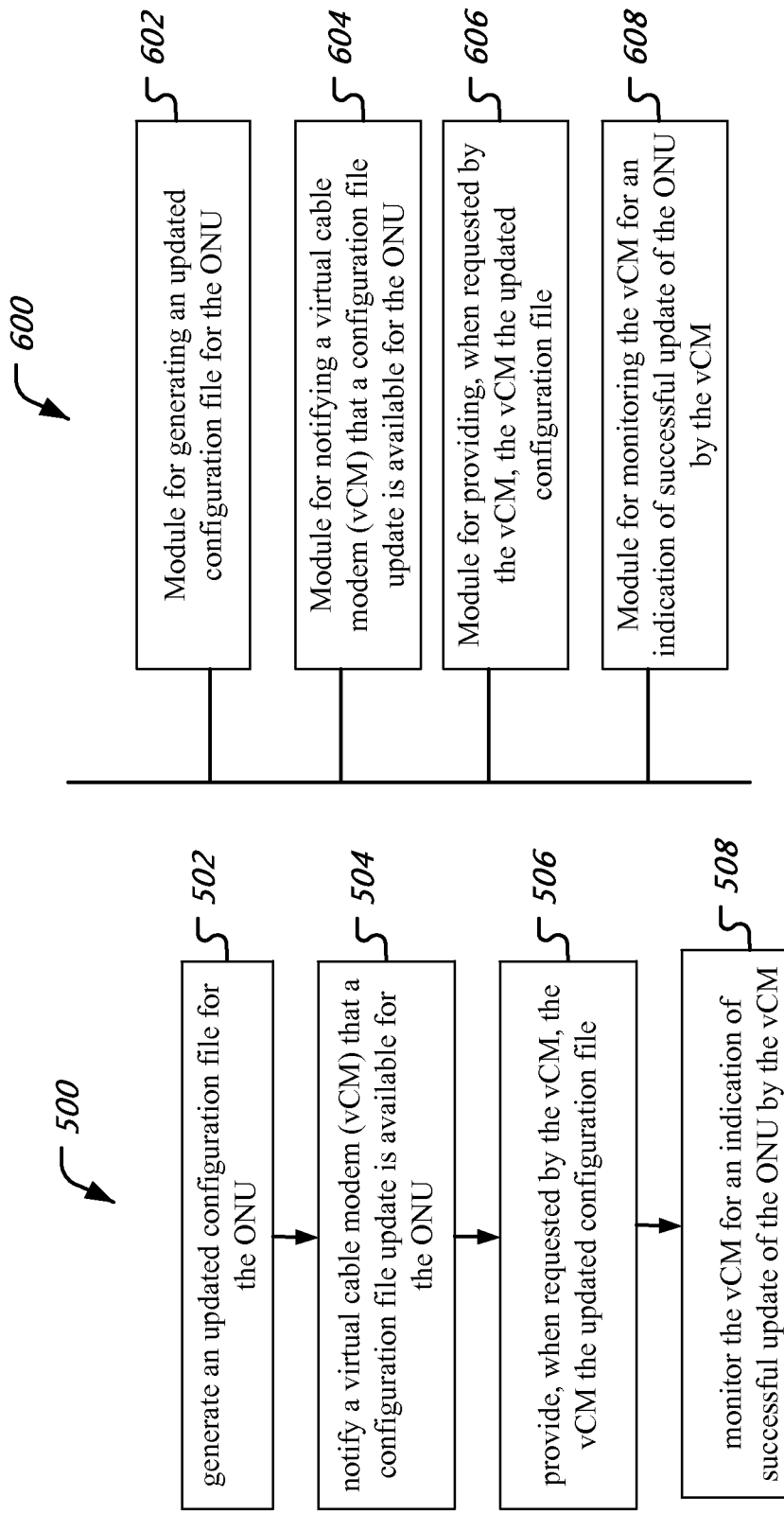

US 9,674,035 B2

SEAMLESS CONFIGURATION UPDATE FOR OPTICAL NETWORK UNIT IN ETHERNET PASSIVE OPTICAL NETWORK

CROSS REFERENCE TO RELATED APPLICATIONS

This patent document claims the benefit of priority of U.S. Provisional Patent Application No. 61/468,504, entitled "SEAMLESS CONFIGURATION UPDATE FOR OPTICAL NETWORK UNIT IN ETHERNET PASSIVE OPTICAL NETWORK," filed on Mar. 28, 2011.

The entire content of the above referenced provisional patent application is incorporated by reference as a part of this patent document.

BACKGROUND

This patent document relates to systems, devices and techniques for data communications in an Ethernet passive optical network (EPON).

Data Over Cable Service Interface Specification (DOCSIS) is a telecommunications standard that permits the addition of high-speed data transfer to an existing Cable TV (CATV) system. DOCSIS is employed by cable television operators to provide data services such as Internet over the hybrid fiber coaxial (HFC) infrastructure. Ethernet Passive Optical Network (EPON) is an optical network architecture based on point to multipoint (P2MP) topology in which a single optical fiber and multiple passive optical splitters are used to provide services from a central office or headend to multiple customer premises. EPON uses a point to point (P2P) Emulation Sublayer to render the P2MP network to appear as a collection of P2P links to the higher protocol layers. A network Operations, Administration and Maintenance (OAM) mechanism is included in EPON to facilitate operations and management of EPON.

DPoE (DOCSIS Provisioning over EPON) uses EPON and a DOCSIS Mediation Layer (DML) solution to provide the translation between the EPON and the DOCSIS back-office systems for provisioning of DOCSIS services. Details of this architecture, as well as expected roles and functionalities of specific network elements, e.g., a Demarcation device, a DPoE Bridge Optical Network Unit (B-ONU), the DPoE System, can be found in the DPoE-SP-ARCH standard, published by CableLabs.

Techniques are needed for controlling the operation of updating configuration of ONUs, without having to reboot the ONUs.

SUMMARY

This document describes technologies, among other things, for seamless configuration updating of an Optical Network Unit (ONU) in an Ethernet Passive Optical Network.

In one aspect, a disclosed method of causing an update to a configuration file used for operation of an Optical Network Unit (ONU) operable in an Ethernet Passive Optical Network (EPON) includes generating an updated configuration file for the ONU, notifying a virtual cable modem (vCM) that a configuration file update is available for the ONU, providing, when requested by the vCM, the vCM the updated configuration file and monitoring the vCM for an indication of successful update of the ONU by the vCM.

In another aspect, a disclosed method of updating configuration of an Optical Network Unit (ONU) in an Ethernet Passive Optical Network (EPON) includes receiving a notification that an updated configuration file is available for the ONU, obtaining the updated configuration file, performing a first validation of the updated configuration file for structural errors, determining changes between a current configuration of the ONU and the updated configuration file to identify ONU resources to implement the changes, performing a second validation about whether the ONU resources to implement the changes are available or not at the ONU and applying the changes to the ONU when it is determined that the ONU resources to implement the changes are available at the ONU.

The details of one or more implementations are set forth in the accompanying attachments, the drawings, and the description below. Other features will be apparent from the description and drawings, and from the claims.

BRIEF DESCRIPTION OF THE DRAWINGS

FIG. 5 is a flowchart representation of a process of updating a configuration file.

FIG. 6 is a block diagram representation of a portion of an apparatus in a DPoE network.

Like reference symbols in the various drawings indicate like elements.

DETAILED DESCRIPTION

This patent document provides, among others, systems, devices and techniques for updating configuration of an optical network unit (ONU) in a communication network based on Data Over Cable Service Interface Specification (DOCSIS) provisioning over Ethernet passive optical network (EPON).

Figure 1:
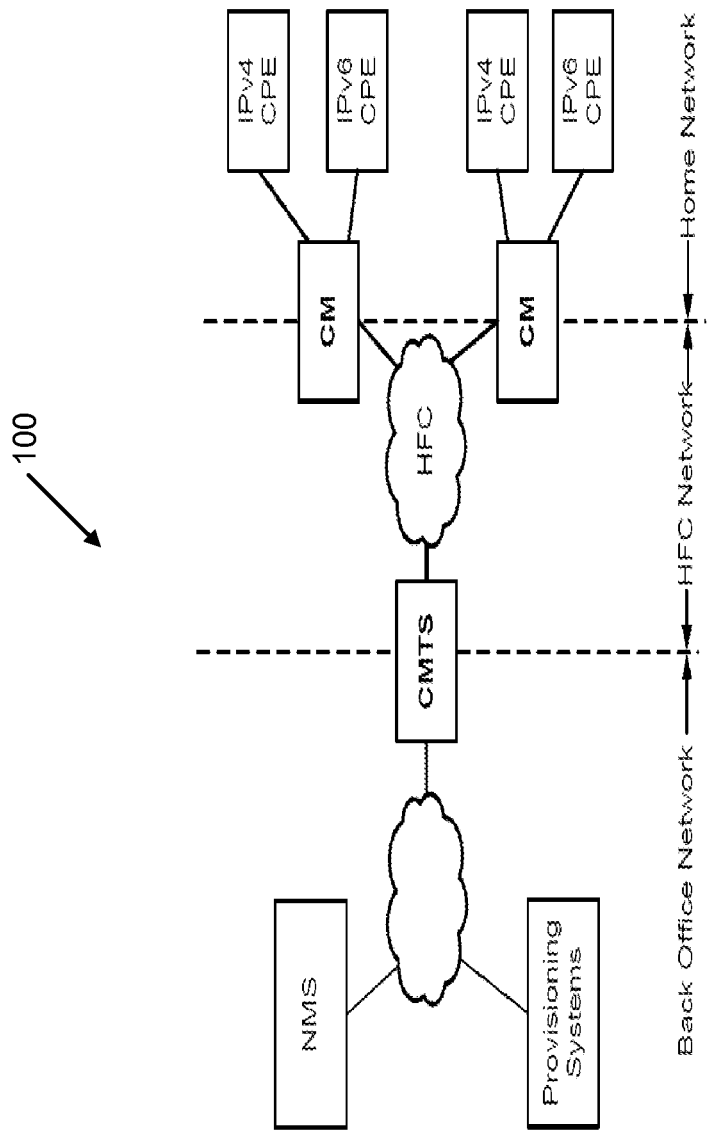
FIG. 1 shows an example of a Data Over Cable System Interface Specification (DOCSIS) system.

A DOCSIS architecture 100 is illustrated in FIG. 1 and includes a back office network with Network Management System (NMS) and provisioning systems, a HFC network and a home network. Network management functions for operating a communication network can include, for example, controlling, planning, allocating, deploying, coordinating, and monitoring the resources of a communication network. These operational functions are supported by Operations Support Systems (OSS).

A cable modem (CM) is typically located at a customer premise as a communication interface between the HFC network and one or more customer premise equipment (CPE) devices. The CM connects to the operator's HFC network and to a home network, bridging packets between them. CPE devices can be embedded with the CM in a single device, or an be separate standalone devices as illustrated. Examples of some CPE devices are home routers, set-top devices and personal computers. A cable modem termination system (CMTS) is located at the CATV headend. Cable systems supporting on-demand programming use a hybrid fiber-coaxial system. Fiber optic lines bring digital signals to nodes in the system where they are converted into RF channels and modem signals on coaxial trunk lines. The CMTS connects the operator's back office and core network with the HFC network. CMTS forwards packets between these two domains, and between upstream and downstream channels on the HFC network.

Figure 2:
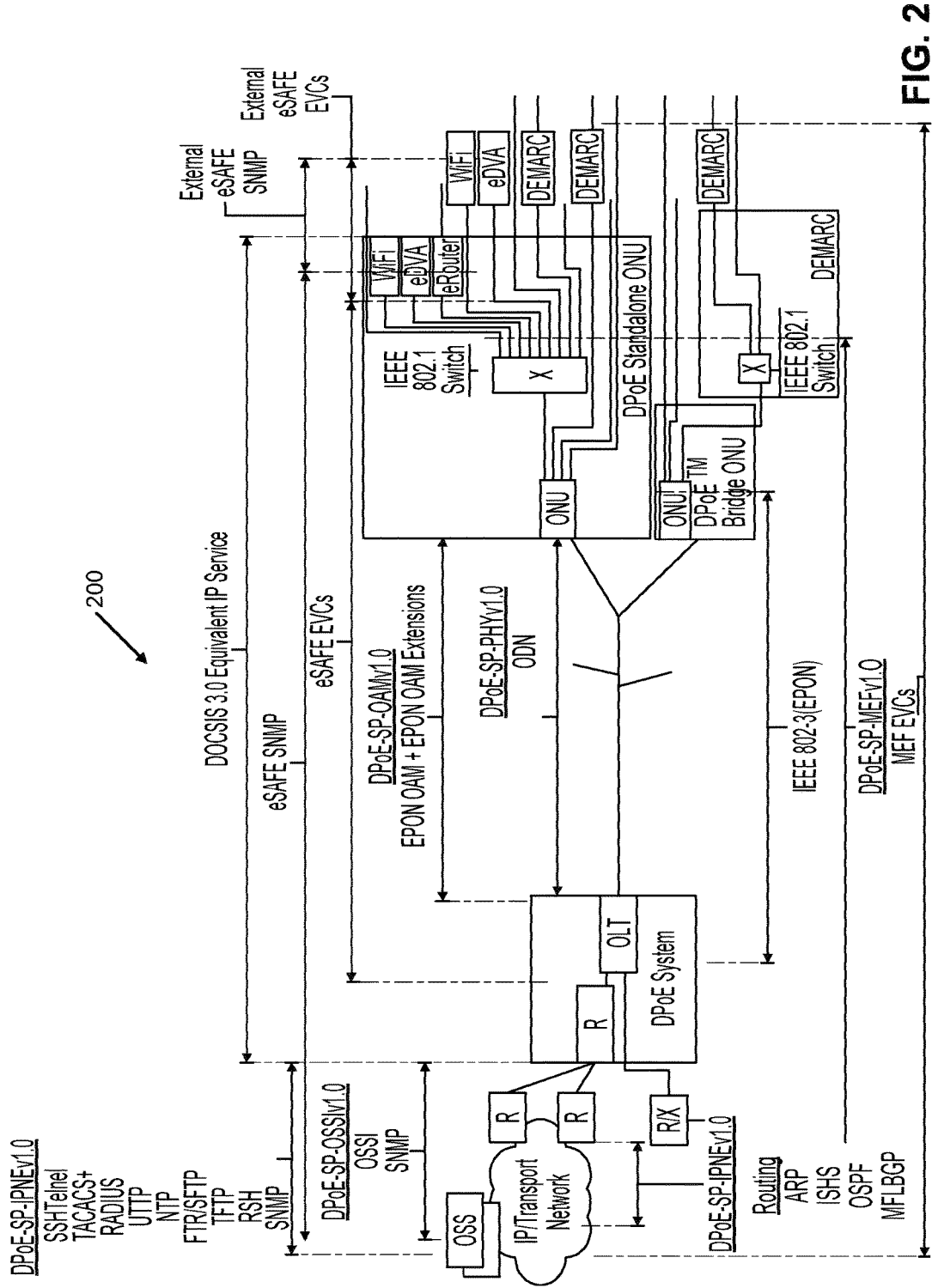
FIG. 2 shows an example of a DOCSIS Ethernet Passive Optical Network (DPoE).

With reference to FIG. 2, which shows an architectural diagram of DPoE (DOCSIS Provisioning over EPON) 200, the DPOE uses EPON and a DOCSIS Mediation Layer (DML) solution to provide the translation between the EPON and the DOCSIS backoffice systems for provisioning of DOCSIS services. Details of this architecture, as well as expected roles and functionalities of specific network elements, e.g., a Demarcation device, one or more DPoE Optical Network Units (ONUs) such as a DPoE Bridge Optical Network Unit (B-ONU), the DPoE System, can be found in the DPoE-SP-ARCH standard, published by Cable-Labs.

In various implementations of DOCSIS systems, a change in the configuration of the Cable Modem (CM) device involves a reboot of the CM device and, after the reboot, polling of a new configuration file from the (T)FTP server located in the central office (CO) is performed to update the configuration of the CM device. This reboot is disruptive to the service provided via the CM device and thus is undesirable.

Consider a specific example for the above disruptive reboot implementation. In such an DPoE Network, DPoE ONU devices are provisioned using DOCSIS like mechanism, in which a DPoE ONU is discovered and registered at the EPON layer (according to IEEE Std 802.3 definitions) and next vCM instance created on the DPoE System issues DHCP request, informing the back-office system about its capabilities and identification. In response, the back-office system informs the vCM about the target config file name as well as the list of (T)FTP address servers holdings its config file. The vCM then polls the said servers in a sequence, obtaining successfully the config file from one of them (usually the first one to respond). Once in the vCM, the config file is translated into a series of DPoE System and DPoE ONU configuration parameters. The DPoE System configuration parameters are used to drive the operation of the EPON OLT located in the DPoE System, while the DPoE ONU parameters are encapsulated in a series of eOAMP-DUs and delivered using the established EPON eOAM link. Next, once at the DPoE ONU, such parameters are used to drive the configuration of the ONU device, specific configuration rules etc. In case of any changes to the DPoE ONU, service etc. configuration, the device has to be rebooted (power cycled) to go through the process of discovery and registration once again in order to restart the vCM and download the updated CM config file with new service-related parameters.

The above reboot process is disruptive to services and, when used to upgrade any of the existing and live services, can adversely affect services provisioned on the given DPoE ONU. It is a default behaviour of the DOCSIS CM devices, which was intended to be emulated by the DPoE I01 specifications, where a CM (vCM or DPoE ONU) remains unprovisioned after reboot and needs to go through the authentication, discovery, registration and finally config file download process to enable any services. This guarantees tighter control over what devices are connected to the network and what services are provisioned on specific devices, allowing the MSO provide strict control over services and customer accounting, something that remains more challenging in open networks, where e.g. any xDSL modem can be registered with the DSLAM without requiring exchange of any specific parameters apart from the user name and password.

The techniques provided in this document can be used to achieve seamless update of DPoE ONU configuration in DPoE Networks without the need to reboot of the DPoE ONU (D-ONU), once the DPoE ONU has been provisioned with the initial configuration file and remains in the operating state. Accordingly, in implementations as described in this document, the ONU configuration parameters, and especially parameters for any configured services, may be changed without affecting other live services operating simultaneously on the ONU. Therefore, the update described in this document is seamless update in the sense that an ONU continues its power and operation without interruption.

Such seamless update can be important for local maintenance and customer support services, in cases where dynamic changes to the service configuration already provisioned on the DPoE ONU is needed. In one example, a service for the given customer might need to be temporarily blocked for any operational reasons while leaving services for other customers provided with the same DPoE ONU unaffected. In another example, service provisioned for a particular customer might need to be modified without affecting services provided for other customers on the same DPoE ONU—in certain business scenarios, bandwidth provided for the given customer might needed to be increased to accommodate expected demand spike, for which customer is charged extra.

The present seamless update can be implemented in ways that the DPoE ONU configuration, and especially any elements of service configuration as provisioned on a DPoE ONU, may be modified from the OSS level without requiring the DPoE ONU to power cycle and go through the regular discovery and registration process as defined in DPoE I01 specifications. For example, the present seamless update can be implemented in a way that overcomes various limitations in dynamic configuration modification of the DPoE ONU devices in some deployment designs in which changes to their configuration, and specifically configuration of the services provided on these devices can require the DPoE ONUs to power cycle and go through the discovery and registration process. The present seamless update can, for example, introduce changes to the service and device configuration on the fly, whereas the default config files for the given DPoE ONU devices stored on the local (T)FTP server remain unchanged, providing a default fall back in case the DPoE ONU device is power cycled and needs to load the initial config file.

Default Mechanism Per DPoE I01 Spec

The default DPoE ONU configuration process can be summarized as follows. The DPoE ONU devices are provisioned using DOCSIS like mechanism, in which a DPoE ONU is discovered and registered at the EPON layer (according to IEEE Std 802.3 definitions) and next vCM instance created on the DPoE System issues DHCP request, informing the back-office system about its capabilities and identification. In response, the back-office system informs the vCM about the target config file name as well as the list of (T)FTP address servers holdings it config file. The vCM then polls the said servers in a sequence, obtaining successfully the config file from one of them. Once in the vCM, the config file is translated into a series of DPoE System and DPoE ONU configuration parameters. The DPoE System configuration parameters are used to drive the operation of the EPON OLT located in the DPoE System, while the DPoE ONU parameters are encapsulated in a series of eOAMP-DUs and delivered using the established EPON eOAM link. Next, once at the DPoE ONU, such parameters are used to drive the configuration of the ONU device, specific configuration rules etc. In case of any changes to the DPoE ONU, service etc. configuration, the device has to be rebooted (power cycled) to go through the process of discovery and registration once again.

Obviously, such a process is disruptive to services and cannot be used in practice to upgrade any of the existing and live services without affecting all services provisioned on the given DPoE ONU.

Once the DPoE ONU is authenticated and securely provisioned, a number of services can be instantiated. For the purpose of further description, it is assumed that the given DPoE ONU supports at least two services, the parameters for one of which will be modified through the proposed mechanism and the other one will remain fully operational during the reconfiguration process.

Seamless Configuration Update for DPoE ONU

The DPoE System initially configures a set of specific services on the D-ONU following the definitions included in the CM config file downloaded by the vCM associated with the D-ONU that has successfully completed EPON discovery and configuration. After that is done, the DPoE ONU operates in a regular fashion, providing specific configured services to connected customers.

Figure 3:
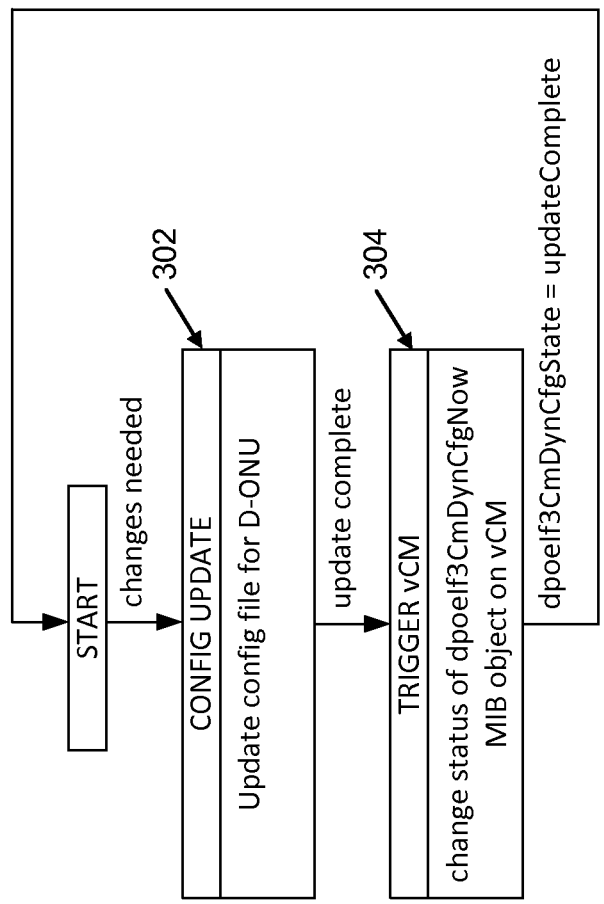
FIG. 3 shows an example flow chart of a procedure of updating configuration of an Optical Network Unit (ONU).
Figure 4:
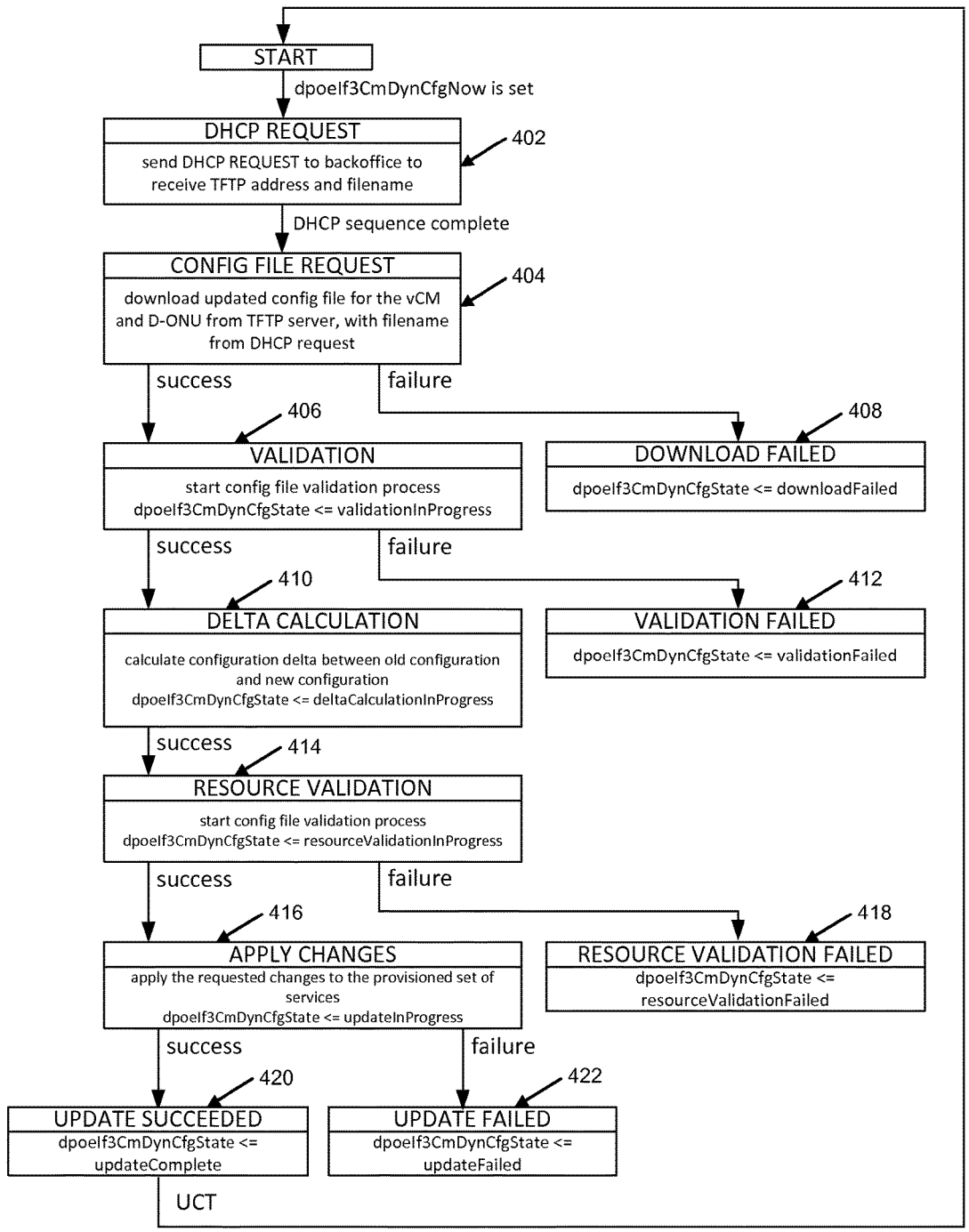
FIG. 4 shows an example flow chart of a procedure of updating configuration of an Optical Network Unit (ONU).

With reference to FIG. 3 and FIG. 4, in which a procedure 300 implemented at the OSS and a procedure 400 implemented at a vCM are shown, certain configuration file updating techniques are described below.

As some point in time, a network operator identifies the need to modify the set of services configured on a D-ONU, resulting in the need to remove an at least one existing service, add at least one new service or simply modify parameters for at least one existing service. In order to do so, the operator may first edit (302) the CM config file (or associated service definitions associated with the given DPoE ONU and stored in the OSS servers), making sure that the DPoE ONU can start using the new CM config file with updated service definitions once and if it is rebooted. Next, using the existing OSS mechanisms, the operator may trigger the vCM to download the updated CM config file (304). This can be achieved by setting the dpoeVcmDynCfgNow MIB object to set. The vCM changes the dpoeVcmDynCfgState object state to "downloadInProgress" in order to reflect the current status of the process. Note that the vCM is permitted to initiate the process of dynamic configuration update only when it is in the "Operational" or "Forwarding Disabled" state and the dpoeVcmDynCfgState state is "notStarted" or "updateComplete".

In the result of setting the dpoeVcmDynCfgNow MIB object, the vCM is requested to re-download the CM config file, which was previously updated by the operator to reflect the new set of service definitions. The vCM uses the standard mechanism defined in DPoE I01 specifications to obtain the said CM config file, starting with DHCP request message (402) and then following with (T)FTP download (404) of the new CM config file into the DPoE System for further processing.

If the CM config file download process fails (408), the vCM is expected to abort the dynamic configuration update process and keep the current active CM config file (CMO) active and operational. Additionally, the vCM also needs to be change the status of the dpoeVcmDynCfgState MIB object to "downloadFailed" to reflect the status of the download process.

Once the new CM config file has been successfully downloaded, the vCM verifies the newly downloaded CM config file (CMN) for any potential configuration errors (structural errors) and potential issues in the service configuration which might prevent DPoE ONU from proper operation, once committed (406). At the beginning of the CMN validation process, the vCM changes the status of the dpoeVcmDynCfgState MIB object to "validationInProgress".

If any CMN errors are detected (412), the vCM may abort the dynamic configuration update process and keep the current active CM config file (CMO) active and operational. Additionally, the vCM also may change the status of the dpoeVcmDynCfgState MIB object to "validationFailed" to reflect the status of the CMN validation process.

When the CMN verification process has been successfully completed, the vCM creates a configuration delta (calculates the difference) between CMO and CMN (410). For this difference calculation, the vCM may keep a copy of the CMO locally to facilitate creating such a delta between CMN and CMO. For all effects and purposes, the vCM is required to maintain both CMN and CMO at any time. The vCM continues to operate using the CMO as long as CMN is being confirmed and committed. Only once CMN has been successfully committed, the vCM may discard CMO and makes CMN a new CMO, awaiting any further changes in the service configuration. The configuration delta is used to drive the DPoE ONU configuration update.

In some implementations, the configuration delta file may be equal to CMN, in which case the whole DPoE ONU configuration will be refreshed. This configuration refresh should not cause the DPoE ONU to reboot during this process, thereby undoing the advantages of the dynamic ONU update process.

Prior to committing the configuration delta to the DPoE ONU, the DPoE System is expected to confirm the availability of hardware and software resources on the DPoE System, vCM and target DPoE ONU to make sure that the new configuration can be executed successfully (414). The DPoE system makes sure that the DPoE System and the D-ONU have the needed resources to provision and support those services; furthermore, it confirms the DPoE System resources and capabilities and also ensures that the D-ONU capabilities can support the modified set of services. During this process, the vCM needs to be change the status of the dpoeVcmDynCfgState MIB object to "resourceValidationInProgress" to reflect the status of the CMN validation process.

If any errors are detected in the configuration delta preventing any DPoE Network element from committing it successfully (418), the vCM is expected to abort the dynamic configuration update process and keep the current active CM config file (CMO) active and operational. Additionally, the vCM also needs to be change the status of the dpoeVcmDynCfgState MIB object to "resourceValidationFailed" to reflect the status of the resource validation process.

Once the resource validation process has been successfully completed (416), the DPoE System moves to update the D-ONU configuration using the configuration delta calculated and confirmed before. At this stage, the vCM changes the status of the dpoeVcmDynCfgState MIB object to "updateInProgress" to reflect the beginning of the update process.

Next, the vCM converts the configuration delta into a set of eOAM configuration parameters addressed to the target DPoE ONU, which are then used to add/modify/delete specific service instances, as requested by the configuration delta calculated by the vCM. Given the successful pass through the resource validation process, the changes committed on the DPoE ONU are expected to be accepted and new definitions for selected subset of services are expected to be employed immediately once the committing process is done.

If any problems are detected during the committing process (422), the vCM changes the status of the dpoeVcmDynCfgState MIB object to "updateFailed" to reflect the failure in the committing process.

Once the committing process has been successfully completed (420) and the DPoE ONU is operating according to CMN, CMO is discarded on the vCM and vCM saves CMN as CMO for the following potential updates to the service configuration. Additionally, the vCM changes the status of the dpoeVcmDynCfgState MIB object to "updateComplete" to reflect the successful completion of the committing process.

During the process of dynamic configuration update, the vCM and D-ONU may preserve any packet counters and current statistics for various sets of services, and related management identifiers which are being moved or changed.

FIG. 5 is a flow chart representation of a procedure 500 of causing an update to a configuration file used for operation of an Optical Network Unit (ONU) operable in an Ethernet Passive Optical Network (EPON). At 502, an updated configuration file is generated for the ONU. At 504, a virtual cable modem (vCM) is notified that a configuration file update is available for the ONU. At 506, when requested by the vCM, the updated configuration file is provided to the vCM. At 508, the vCM is monitored for an indication of successful update of the ONU by the vCM.

FIG. 6 is a block diagram representation a portion of an apparatus 600. The module 602 is for generating an updated configuration file for the ONU. The module 604 is for notifying a virtual cable modem (vCM) that a configuration file update is available for the ONU. The module 606 is for providing, when requested by the vCM, the vCM the updated configuration file. The module 608 is for monitoring the vCM for an indication of successful update of the ONU by the vCM.

Figures 7, 8:
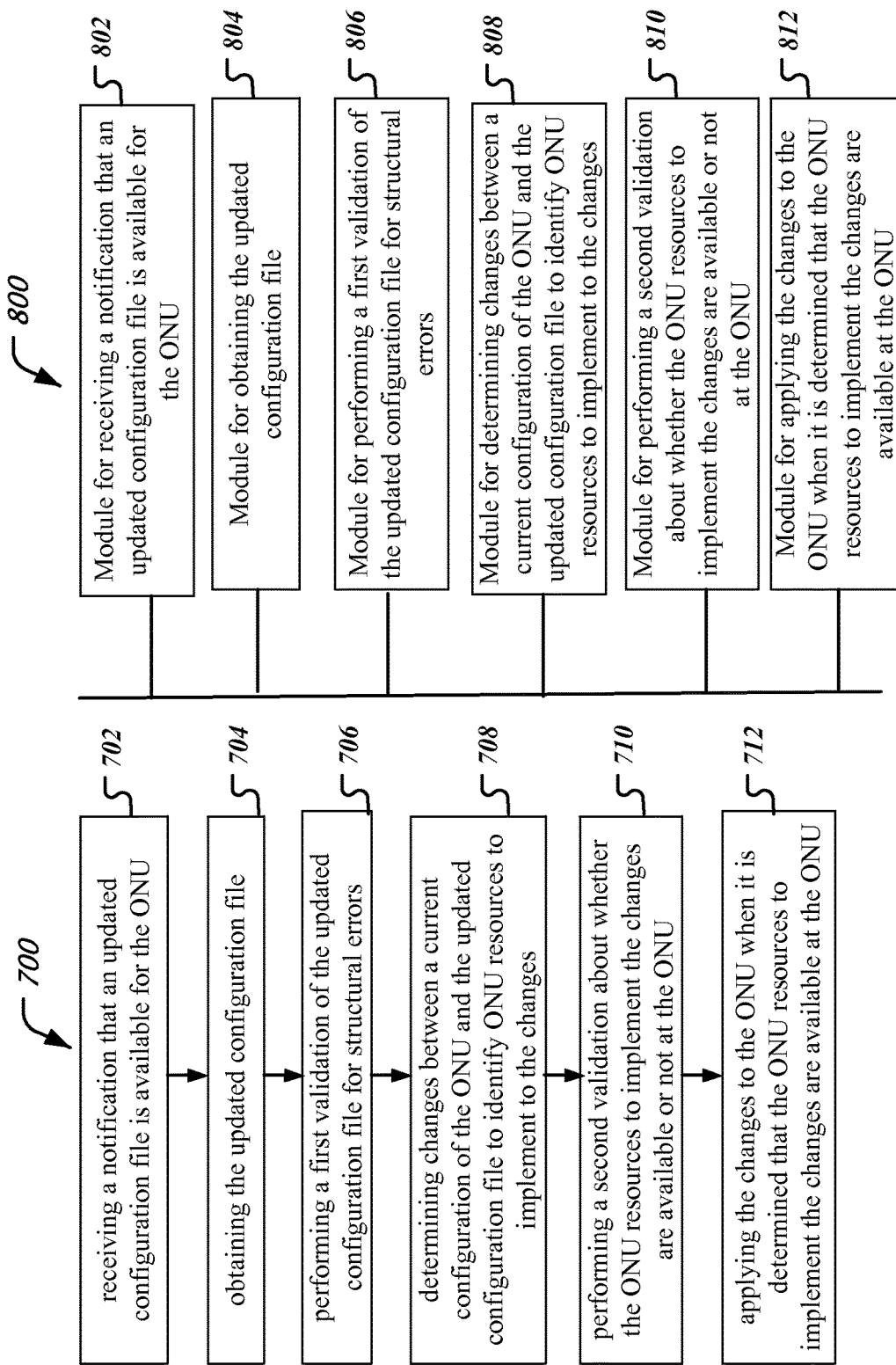
FIG. 7 is a flowchart representation of a process of updating a configuration file.
FIG. 8 is a block diagram representation of a portion of an apparatus in a DPoE network.

FIG. 7 is flow chart representation of a procedure 700 of updating configuration of an Optical Network Unit (ONU) in an Ethernet Passive Optical Network (EPON). At 702, a notification that an updated configuration file is available for the ONU is received. At 704, the updated configuration file is obtained. At 706, a first validation is performed of the updated configuration file for structural errors. At 708, changes between a current configuration of the ONU and the updated configuration file are determined to identify ONU resources to implement to the changes. At 710, a second validation about whether the ONU resources to implement the changes are available or not at the ONU is performed. At 712, the changes are applied to the ONU when it is determined that the ONU resources to implement the changes are available at the ONU.

FIG. 8 is a block diagram representation of an apparatus 800 for updating configuration of an Optical Network Unit (ONU) in an Ethernet Passive Optical Network (EPON). The module 802 is for receiving a notification that an updated configuration file is available for the ONU. The module 804 is for obtaining the updated configuration file. The module 806 is for performing a first validation of the updated configuration file for structural errors. The module 808 is for determining changes between a current configuration of the ONU and the updated configuration file to identify ONU resources to implement to the changes. The module 810 is for performing a second validation about whether the ONU resources to implement the changes are available or not at the ONU. The module 812 is for applying the changes to the ONU when it is determined that the ONU resources to implement the changes are available at the ONU.

It will be appreciated that techniques for updating the configuration file being used by an ONU without having to reboot the ONU have been provided. In one aspect, the virtual cable mode, which connects the ONU with the OSS, manages the process while advertising the progress and the state of the configuration file update via certain entries in a management information base (MIB).

It will further be appreciated that, prior to applying changes, the desired configuration updates are first checked against available resources to ensure that the desired changes will not cause any disruption in services.

The disclosed and other embodiments, modules and the functional operations described in this document (e.g., a generator, a notifier, a file provider, a monitor, a detector, a modifier, a changer, a receiver, a location provider, a file transferor, a validator, an applier, a sender, an obtainer, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of causing an update to a configuration file used for operation of an Optical Network Unit (ONU) operable in an Ethernet Passive Optical Network (EPON), the method comprising:
   generating, using at least one computer, an updated configuration file for the ONU, wherein the ONU is configured with an existing configuration file;
   notifying a virtual cable modem (vCM), prior to successful update of the ONU, that the updated configuration file is available for the ONU;
   providing, when requested by the vCM, to the vCM, the updated configuration file; and
   monitoring the vCM for an indication of successful update of the ONU by the vCM using the updated configuration file.

2. The method of claim 1, further wherein the operation of generating the updated configuration file includes:
   detecting a configuration change need for the ONU; and
   modifying at least one service listed in the configuration file to generate the updated configuration file.

3. The method of claim 1, wherein the operation of notifying the vCM includes:
   changing a variable in a management information base (MIB) of the vCM.

4. The method of claim 1, wherein the operation of providing the updated configuration file includes:
   receiving a dynamic host control protocol (DHCP) request from the vCM;
   providing the vCM information about a location of the updated configuration file; and
   permitting the vCM to download the updated configuration file using a file transfer protocol (FTP).

5. An apparatus for facilitating an update to a configuration file used for operation of an Optical Network Unit (ONU) operable in an Ethernet Passive Optical Network (EPON), the apparatus comprising:
   a generator that generates an updated configuration file for the ONU, wherein the ONU is configured with an existing configuration file;
   a notifier that notifies a virtual cable modem (vCM), prior to successful update of the ONU, that the updated configuration file is available for the ONU; and
   a file provider that provides, when requested by the vCM, to the vCM, the updated configuration file; and
   a monitor that monitors the vCM for an indication of successful update of the ONU by the vCM using the updated configuration file.

6. The apparatus of claim 5, further wherein the generator includes:
   a detector that detects a configuration change need for the ONU; and
   a modifier that modifies at least one service listed in the configuration file to generate the updated configuration file.

7. The apparatus of claim 5, wherein the notifier includes:
   a changer that changes a variable in a management information base (MIB) of the vCM.

8. The apparatus of claim 5, wherein the file provider includes:
   a receiver receiving a dynamic host control protocol (DHCP) request from the vCM;
   a location provider that provides the vCM information about a location of the updated configuration file; and
   a file transferor that permits the vCM to download the updated configuration file using a file transfer protocol (FTP).

9. A computer program product comprising a non-transitory computer-readable medium having code stored thereon, the code, when executed by a processor, causing the processor to implement a method of causing an update to a configuration file used for operation of an Optical Network Unit (ONU) operable in an Ethernet Passive Optical Network (EPON), the method comprising:
   generating an updated configuration file for the ONU, wherein the ONU is configured with an existing configuration file;

notifying a virtual cable modem (vCM), prior to successful update of the ONU, that the updated configuration file is available for the ONU; and providing, when requested by the vCM, to the vCM, the updated configuration file; and monitoring the vCM for an indication of successful update of the ONU by the vCM using the updated configuration file.

10. The computer program product comprising the non-transitory computer-readable medium of claim 9, further wherein the operation of generating the updated configuration file includes:

detecting a configuration change need for the ONU; and modifying at least one service listed in the configuration file to generate the updated configuration file.

11. The computer program product comprising the non-transitory computer-readable medium of claim 9, wherein the operation of notifying the vCM includes:

changing a variable in a management information base (MIB) of the vCM.

12. The computer program product comprising the non-transitory computer-readable medium of claim 9, wherein the operation of providing the updated configuration file includes:

receiving a dynamic host control protocol (DHCP) request from the vCM;

providing the vCM information about a location of the updated configuration file; and permitting the vCM to download the updated configuration file using a file transfer protocol (FTP).

13. An apparatus for causing an update to a configuration file used for operation of an Optical Network Unit (ONU) operable in an Ethernet Passive Optical Network (EPON), the apparatus comprising:

means for generating an updated configuration file for the ONU, wherein the ONU is configured with an existing configuration file;

means for notifying a virtual cable modem (vCM), prior to successful update of the ONU, that the updated configuration file is available for the ONU; and means for providing, when requested by the vCM, to the vCM, the updated configuration file; and means for monitoring the vCM for an indication of successful update of the ONU by the vCM using the updated configuration file.

14. A method of updating configuration of an Optical Network Unit (ONU) in an Ethernet Passive Optical Network (EPON), the method comprising:

receiving a notification that an updated configuration file is available for the ONU, wherein the ONU is configured with a current configuration file;

obtaining the updated configuration file;

performing, using at least one computer, a first validation of the updated configuration file for structural errors;

determining changes between the current configuration file of the ONU and the updated configuration file to identify ONU resources to implement to the changes;

performing a second validation about whether the ONU resources to implement the changes are available or not at the ONU; and applying the changes to the ONU when it is determined that the ONU resources to implement the changes are available at the ONU.

15. The method recited in claim 14, wherein the operation of receiving the notification includes detecting a change to a management information base (MIB) entry.

16. The method recited in claim 14, wherein the operation of obtaining the updated configuration file includes:

sending a dynamic host control protocol (DHCP) message;

receiving one or more identities of servers storing the updated configuration file; and obtaining the updated configuration file from one of the servers using a file transfer protocol (FTP).

17. The method recited in claim 14, further including:

indicating an ongoing configuration update using a MIB entry during the updating operation.

18. The method recited in claim 14, further including:

deleting the updated configuration file from a local memory after successful completion of the applying operation.

19. The method of claim 14, further comprising:

performing a third validation about whether an Optical Line Terminal (OLT) and a DOCSIS Ethernet passive optical network (DPoE) system include resources to implement the changes in the updated configuration file.

20. An apparatus for updating configuration of an Optical Network Unit (ONU) in an Ethernet Passive Optical Network (EPON), the apparatus comprising:

a receiver that receives a notification that an updated configuration file is available for the ONU, wherein the ONU is configured with a current configuration file;

an obtainer that obtains the updated configuration file;

a first validator that performs a first validation of the updated configuration file for structural errors;

a determiner that determines changes between the current configuration file of the ONU and the updated configuration file to identify ONU resources to implement to the changes;

a second validator that performs a second validation about whether the ONU resources to implement the changes are available or not at the ONU; and an applier that applies the changes to the ONU when it is determined that the ONU resources to implement the changes are available at the ONU.

21. The apparatus recited in claim 20, wherein the receiver includes:

a detector that detects a change to a management information base (MIB) entry.

22. The apparatus recited in claim 20, wherein the operation of obtaining the updated configuration file includes:

a sender that sends a dynamic host control protocol (DHCP) message;

another receiver that receivers one or more identities of servers storing the updated configuration file; and another obtainer that obtains the updated configuration file from one of the servers using a file transfer protocol (FTP).

23. The apparatus recited in claim 20, further including:

an indicator that indicates an ongoing configuration update using a MIB entry during the updating operation.

24. The apparatus recited in claim 20, further including:

a deleter that deletes the updated configuration file from a local memory after successful completion of the applying operation.

25. The apparatus recited in claim 20, further comprising:

a third validator that performs a third validation about whether an Optical Line Terminal (OLT) and a DOCSIS Ethernet passive optical network (DPoE) system include resources to implement the changes in the updated configuration file.

26. A computer program product comprising a non-transitory computer-readable medium having code stored thereon, the code, when executed by a processor, causing the processor to implement a method of updating configuration of an Optical Network Unit (ONU) in an Ethernet Passive Optical Network (EPON), the method comprising:

receiving a notification that an updated configuration file is available for the ONU wherein the ONU is configured with a current configuration file;

obtaining the updated configuration file;

performing a first validation of the updated configuration file for structural errors;

determining changes between the current configuration file of the ONU and the updated configuration file to identify ONU resources to implement to the changes;

performing a second validation about whether the ONU resources to implement the changes are available or not at the ONU; and applying the changes to the ONU when it is determined that the ONU resources to implement the changes are available at the ONU.

27. The computer program product comprising the non-transitory computer-readable medium recited in claim 26, wherein the operation of receiving the notification includes detecting a change to a management information base (MIB) entry.

28. The computer program product comprising the non-transitory computer-readable medium recited in claim 26, wherein the operation of obtaining the updated configuration file includes:

sending a dynamic host control protocol (DHCP) message;

receiving one or more identities of servers storing the updated configuration file; and obtaining the updated configuration file from one of the servers using a file transfer protocol (FTP).

29. The computer program product comprising the non-transitory computer-readable medium recited in claim 26, further including:

indicating an ongoing configuration update using a MIB entry during the updating operation.

30. The computer program product comprising the non-transitory computer-readable medium recited in claim 26, further including:

deleting the updated configuration file from a local memory after successful completion of the applying operation.

31. The computer program product comprising the non-transitory computer-readable medium of claim 26, further comprising:

performing a third validation about whether an Optical Line Terminal (OLT) and a DOCSIS Ethernet passive optical network (DPoE) system include resources to implement the changes in the updated configuration file.

32. An apparatus for updating configuration of an Optical Network Unit (ONU) in an Ethernet Passive Optical Network (EPON), the apparatus comprising:

means for receiving a notification that an updated configuration file is available for the ONU, wherein the ONU is configured with a current configuration file;

means for obtaining the updated configuration file;

means for performing a first validation of the updated configuration file for structural errors;

means for determining changes between the current configuration file of the ONU and the updated configuration file to identify ONU resources to implement to the changes;

means for performing a second validation about whether the ONU resources to implement the changes are available or not at the ONU; and means for applying the changes to the ONU when it is determined that the ONU resources to implement the changes are available at the ONU.

* * * * *